(12) United States Patent
Hernier et al.

(10) Patent No.: US 9,777,663 B2
(45) Date of Patent: Oct. 3, 2017

(54) METHOD, A COMPUTER PROGRAM, AN ELECTRONIC STORAGE MEDIUM, AND AN ELECTRONIC CONTROL UNIT FOR CONTROLLING AN INTERNAL COMBUSTION ENGINE

(71) Applicant: Robert Bosch GmbH, Stuttgart (DE)

(72) Inventors: Markus Hernier, Gerlingen (DE); Udo Schulz, Vaihingen/Enz (DE); Johannes-Joerg Rueger, Esslingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 76 days.

(21) Appl. No.: 14/950,752

(22) Filed: Nov. 24, 2015

(65) Prior Publication Data
US 2016/0160788 A1    Jun. 9, 2016

(30) Foreign Application Priority Data
Dec. 9, 2014   (DE) .................. 10 2014 225 321

(51) Int. Cl.
*F02D 41/30* (2006.01)
*F02D 41/40* (2006.01)

(52) U.S. Cl.
CPC ............ *F02D 41/30* (2013.01); *F02D 41/40* (2013.01); *F02D 41/401* (2013.01); *F02D 41/402* (2013.01); *F02D 2200/501* (2013.01); *F02D 2250/21* (2013.01); *Y02T 10/44* (2013.01)

(58) Field of Classification Search
CPC ............ F02B 19/1085; F02D 35/0046; F02D 41/0052; F02D 41/405

USPC ......... 701/101, 103–105, 110; 123/304, 305, 123/577
See application file for complete search history.

(56) References Cited

U.S. PATENT DOCUMENTS

| | | | |
|---|---|---|---|
| 2010/0229831 A1* | 9/2010 | Hernier ................. | B60W 10/02 123/447 |
| 2014/0032081 A1* | 1/2014 | Willi ................... | F02B 23/0672 701/104 |
| 2016/0201594 A1* | 7/2016 | Matsubara ............. | F02D 41/38 123/299 |

FOREIGN PATENT DOCUMENTS

DE    10 2013 223 489    5/2015

* cited by examiner

*Primary Examiner* — John Kwon
(74) *Attorney, Agent, or Firm* — Norton Rose Fulbright US LLP; Gerard Messina

(57) ABSTRACT

A method for controlling an internal combustion engine provides that the internal combustion engine is operated based on a first injection pattern in a first operating state, and based on a second injection pattern in a second operating state. At least one parameter of the injection patterns in the transition from the first to the second operating state is selected in such a way that the noise emission remains constant. In the transition to the injection pattern having greater noise, first the at least one parameter of the first injection pattern is varied, whereupon the switchover takes place. In the transition to the injection pattern having the lower noise, first the switchover is implemented, whereupon the at least one parameter of the second injection pattern is varied.

14 Claims, 2 Drawing Sheets

METHOD, A COMPUTER PROGRAM, AN ELECTRONIC STORAGE MEDIUM, AND AN ELECTRONIC CONTROL UNIT FOR CONTROLLING AN INTERNAL COMBUSTION ENGINE

RELATED APPLICATION INFORMATION

The present application claims priority to and the benefit of German patent application no. 10 2014 225 321.7, which was filed in Germany on Dec. 9, 2014, the disclosure of which is incorporated herein by reference.

FIELD OF THE INVENTION

The present invention concerns a method, a computer program, an electronic storage medium and an electronic control unit for controlling an internal combustion engine.

BACKGROUND INFORMATION

A method for controlling an internal combustion engine is discussed in the publication DE 10 2013 223 489. In the method discussed there, an injection process is subdivided into at least three partial injections. Different parameters are selected to ensure that the noise emissions are as low as possible. The interval between the individual partial injections and the subdivision of the injection quantities to the individual partial injections are predefined accordingly, in the form of parameters. This injection pattern is also referred to as "pine tree pattern".

Modern internal combustion engines use different injection patterns depending on the load and the rotational speed of the internal combustion engine. In the partial load range, for instance, the so-called "pine tree injection pattern" is used. This offers advantages as far as the reduction of combustion noise is concerned. The combustion noise is simply referred to as noise in the following text. At higher loads, the injection pattern changes toward boat or block injections. The combustion noise is of lesser concern here since the driving noise predominates. The block injection is characterized in that the fuel is supplied to the combustion chambers essentially in a single injection procedure. One or more preinjection(s) and post-injection(s) may possibly be provided. The main injection, on the other hand, takes place in the form of one injection. In the boat injection, a smaller injection rate is selected at the start of the injection. That means that a smaller fuel quantity per time unit or angle unit is injected. In the pine tree injection, the main injection is subdivided into numerous partial injections, usually three or more; these are difficult to distinguish from the post-injection and/or preinjection.

Each subdivision of the injection quantity into further injection types means further charge and discharge processes of piezo actuators and thus increased power losses of the control unit. As a rule, certain injection patterns, such as the pine tree pattern, are therefore not to be used in all operating states. The pine tree pattern may be employed only in cases where it is useful, which is the case at low loads and/or small rotational speeds, in particular.

In other words, a switchover as a function of the operating state must take place between injection patterns. These switchovers result in partially abrupt changes in the noise emissions. Such changes in the switchover of the injection patterns at slight changes in the operating point of the internal combustion engine may be perceived as annoying by the driver and possibly be interpreted as an error.

SUMMARY OF THE INVENTION

In one aspect, the present invention relates to program code together with processing instructions for setting up a computer program that is able to be added to a control unit, in particular source code with compiler and/or linking instructions, the program code resulting in the computer program for the execution of all the steps of one of the described methods when it is converted into a computer program that is able to be run according to the processing instructions, i.e., in particular compiled and/or linked. This program code may be provided by source code, in particular, which is able to be downloaded from a server on the internet, for example.

In particular, the method of the present invention, having the features described herein, has the advantage of avoiding such acoustically noticeable switchovers of injection patterns.

In the method according to the present invention, the internal combustion engine is operated on the basis of a first injection pattern in a first operating state and on the basis of a second injection pattern in a second operating state. In the transition from the first operating state to the second operating state, at least one parameter of the injection patterns is selected in such a way that the noise emission remains constant. In the transition to the injection pattern having higher noise, the parameters of the first injection pattern are varied first, followed by the switchover. In the transition to the injection pattern having lower noise, a switchover takes place first and then the parameters of the second injection pattern are modified.

In one advantageous embodiment, a switchover takes place in operating states featuring high noise emissions without any adaptation of the parameters of the injection patterns. In operating states of this type, the changes in the noise emissions are not noticeable by the driver, and a rapid switchover is possible.

It is especially advantageous if the load of the internal combustion engine or the driver wish are used as the operating state.

Furthermore, it is especially advantageous if the switchover takes place in a moment-neutral manner. This avoids an unintended jerk which is noticeable by the driver.

Core of the present invention is the switchover of injection patterns in that the control starts and/or the injection periods of the injection types of the potentially acoustically better injection pattern are varied in a moment-neutral manner such that a sliding acoustic transition takes place.

In the switchover from the basically acoustically worse to the basically acoustically better injection pattern, the parameters, such as the control starts and/or injection periods of the injection types, of the basically acoustically better injection pattern are adjusted in the first step, in such a way that a virtually acoustically neutral switchover of the basic patterns takes place. Only then will the parameters of the basically acoustically better injection pattern be modified in the direction of better noise emissions in each further working cycle in a moment-neutral and step by step manner, until the acoustic target state of the injection pattern for the individual load level of the internal combustion engine has been reached.

In the switchover from the basically acoustically better to the basically acoustically worse injection pattern, the parameters of the basically acoustically better injection pattern are modified toward a poorer noise emission with each further working cycle in a step by step and moment-neutral manner, until the acoustic state of the injection pattern for the acoustically worse injection pattern for the individual load level of the internal combustion engine has been reached; only then does a switchover take place to the basically acoustically poorer injection pattern.

In the following text the present invention is elucidated with reference to the appended drawing.

DETAILED DESCRIPTION

Figure 1:
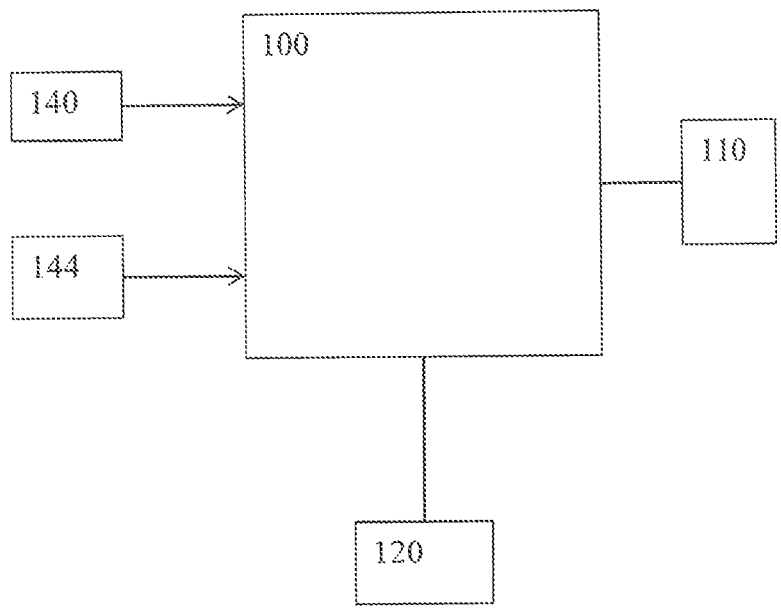
FIG. 1 shows a schematic illustration of a device for controlling an internal combustion engine.

A control unit is denoted by 100 in FIG. 1. It applies control signals to different injectors 110 of an internal combustion engine. Sensors 120 supply signals that characterize the operating state of the internal combustion engine to control 100. In addition, the control is connected to a characteristics map 140 and an acoustic pattern characteristics map 144.

Injection patterns to be realized as a function of the operating state are stored in characteristics map 140. Characteristics map 140 is subdivided into different ranges, in which different injection patterns are used.

Each injection pattern normally has an acoustic optimum. As a rule the acoustic optima of the different injection patterns audibly differ from each other. In a hard switchover of the injection patterns, a sudden acoustic change occurs, which the driver is able to notice.

Acoustic pattern characteristics map 144 is provided with the same operating states and range limits for injection patterns as characteristics map 140. It can be defined in advance in the application phase of the vehicle or the internal combustion engine and be stored in the data set of control 100. In the simplest case, these are combustion pressure gradients that may be used as indicators for the combustion noise. A combustion pressure gradient is always assigned to a load level. In a further embodiment or as an alternative to combustion pressure gradients, noise level values of particularly audible frequencies of the combustion engine noise in the specific working point are conceivable. Additional corrections are possible as a function of the engine temperature, etc., for example.

With the aid of this characteristics map it can be determined how great the change in the noise emissions is and whether and how many, steps/working cycles are required for the acoustically sliding transition.

Based on the current or future operating state of the internal combustion engine, the principal injection patterns are able to be assigned to the operating states. The injection pattern for the operating state of the internal combustion engine that is left or the particular pattern to which it is switched is ascertained.

If the current and the desired operating states lie in ranges of different injection patterns and if the changes in the acoustic patterns lie above applied thresholds, i.e., they would occur as abrupt acoustic changes of the combustion engine noises that a driver could clearly perceive, the procedure as described in the following text will be used.

In the switchover from the basically acoustically worse to the basically acoustically better injection pattern, the control starts and/or injection periods of the injections of the basically acoustically better injection pattern are set in the first step, such that a virtually acoustically neutral switchover of the principal pattern occurs. Only then will the control starts and/or the control periods of the injections of the basically acoustically better injection pattern be changed toward better noise emissions with each further working cycle in a step by step and moment-neutral manner, until the acoustic target state of the injection pattern for the particular operating state of the internal combustion engine has been reached.

The change from the basically acoustically worse to the basically acoustically better injection pattern may take place when changing from a full load to a partial load operating point, for instance. A less complex injection pattern is used in the initial operating point, and a more complex injection pattern is employed in the target operating point.

In particular the pine tree pattern basically offers a greater potential for shaping the combustion chamber pressure characteristic, and thus for reducing the noise emissions, than a block injection or a boat injection.

Multiple moment-neutral but acoustically different parameters of the individual injection patterns may exist for the individual operating state.

The number of different parameters for an operating state is based on the maximally accepted change in the noise emissions from one working cycle to the next and the change in the noise emissions from the initial operating state to the target operating state.

The following possibilities may be used for worsening the noise emissions:

An enlargement of the interval between the partial injections, in particular between the main injection and the pre-injections that precede it; shortening the injection pauses between partial injections, a flattening of the opening rates of the pre-injection at small injection quantities lead to high ignition retardation, i.e., the injection quantity is converted only by the following injection or even later; a reduction of the control duration and thus the injected fuel quantities of the pre-injections.

The acoustically acceptable step width of the change in the control start and control duration correlates with a reliable, maximal change in noise emissions that are not perceived as bothersome by the driver, from one working cycle to the next. It is stored as an application value in control 100.

The number of steps results from the acoustic worsening of the pine tree profile target injection pattern divided by the acoustically acceptable step width of the changes in the control start and control duration.

In the switchover from the basically acoustically better to the basically acoustically worse injection pattern, the control starts and/or injection durations of the injection types of the basically acoustically better injection pattern are changed toward a worse noise emission with each further working cycle in a step by step manner, until the acoustic state of the injection pattern for the acoustically worse injection pattern for the individual load level of the combustion engine has been reached; only then will a switch take place to the basically acoustically worse injection pattern.

To improve the noise emissions, the following possibilities may be used: Reducing the interval between the partial injections, in particular between the main injection and/or the preceding pre-injection(s), increasing the injection pauses between partial injections, increasing the opening rates of the pre-injection, enlarging the control duration and thus the injected fuel quantities of the pre-injections.

In one advantageous embodiment, an immediate switch to the new injection pattern takes place at higher driving speeds, because the abrupt change in the noise emissions is covered by the driving noise. In one advantageous embodiment, it may also be provided that the step width at which the parameters are changed is selected larger at higher driving speeds.

Figure 2:
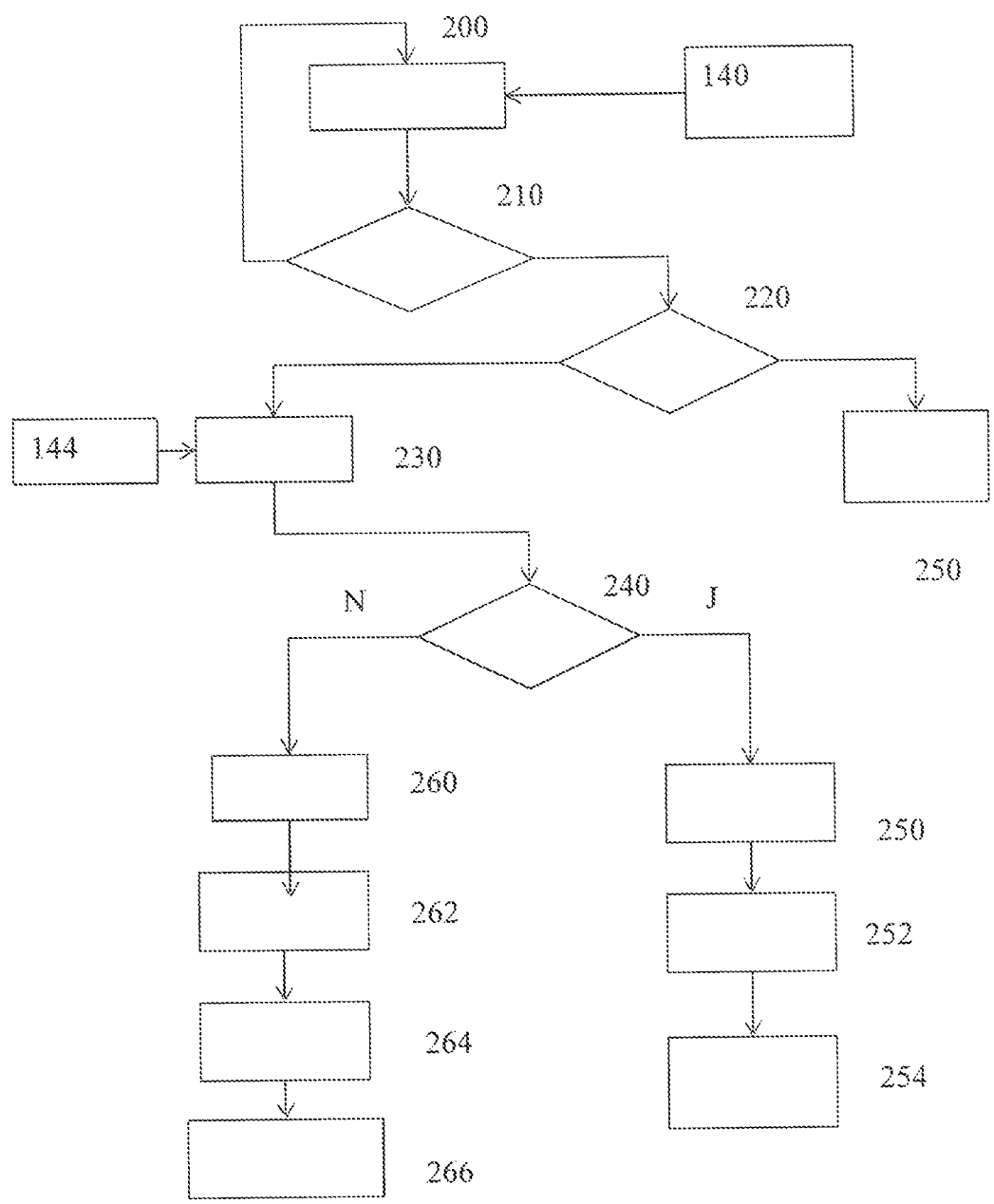
FIG. 2 shows a flow chart for illustrating one specific embodiment of the method of the present invention.

FIG. 2 shows one specific embodiment of the method according to the present invention. In a first step 200, it is read out from characteristics map 140 which particular injection pattern is optimal for the current operating state. The subsequent query checks whether the injection pattern has changed since the last program run-through, or since the last read-out of the injection pattern. Step 200 is carried out at regular time intervals or after a certain crankshaft angle has passed.

If step 210 detects that the injection pattern has changed, query 220 ensues. This query checks whether an operating state is at hand in which high noise emissions occur. For example, this is the case at high driving speeds, high rotational speeds of the internal combustion engine, or a high load of the internal combustion engine. If such an operating state is detected, step 250, in which an immediate switch to the new injection pattern takes place, ensues immediately.

If query 220 detects that no such operating state is at hand, then the noise emission of the internal combustion engine in the new operating state is read out from acoustic characteristics map 144 in step 230.

Query 240 checks whether the noise emissions in the new operating state are higher than in the old operating state. If this is the case, step 250 follows. In step 250, the step width at which the parameters of the old injection pattern are changed is specified. Subsequently, in step 252, the parameters of the old injection pattern are varied until the noise emissions of the old and the new injection patterns are the same. If this is the case, a switch to the new injection pattern takes place in step 254.

If query 240 detects that the noise emissions are lower in the new operating state than in the old operating state, step 260 follows. In step 260, the parameters of the new operating state are selected in such a way that the noise emissions are identical in both operating states. In step 262, a switch to the new injection pattern then takes place. In step 264, the step width of the change in the parameters is ascertained accordingly, like in step 250. In the following step 266, the parameters are varied step by step until the optimal parameters for the noise emission are present.

What is claimed is:

1. A method for controlling an internal combustion engine, the method comprising:
   operating an internal combustion engine based on a first injection pattern in a first operating state, and based on a second injection pattern in a second operating state;
   selecting at least one parameter of the injection patterns in a transition from the first operating state to the second operating state so that the noise emission remains constant;
   in a transition from an injection pattern having a lower noise to an injection pattern having a higher noise, first varying the at least one parameter of the first injection pattern in a step-by-step manner, and then performing a switchover to the injection pattern having the higher noise; and
   in the transition from an injection pattern having a higher noise to an injection pattern having a lower noise, first performing a switchover to the injection pattern having the lower noise, and then varying the at least one parameter of the second injection pattern in a step-by-step manner.

2. The method of claim 1, wherein when a switchover into certain operating states takes place, a switchover between one injection pattern to another injection pattern takes place immediately.

3. The method of claim 1, wherein the load of the internal combustion engine is used as operating state.

4. The method of claim 1, wherein the switchover takes place in a moment-neutral manner, wherein the moment-neutral manner avoids a jerk of the engine.

5. A computer readable medium having a computer program, which is executable by a processor, comprising:
   a program code arrangement having program code for controlling an internal combustion engine, by performing the following:
      operating an internal combustion engine based on a first injection pattern in a first operating state, and based on a second injection pattern in a second operating state;
      selecting at least one parameter of the injection patterns in a transition from the first operating state to the second operating state so that the noise emission remains constant;
      in a transition from an injection pattern having a lower noise to an injection pattern having a higher noise, first varying the at least one parameter of the first injection pattern in a step-by-step manner, and then performing a switchover to the injection pattern having the higher noise; and
      in the transition from an injection pattern having a higher noise to an injection pattern having a lower noise, first performing a switchover to the injection pattern having the lower noise, and then varying the at least one parameter of the second injection pattern in a step-by-step manner.

6. The computer readable medium of claim 5, wherein when a switchover into certain operating states takes place, a switchover between one injection pattern to another injection pattern takes place immediately .

7. A control unit for controlling an internal combustion engine, comprising:
   a control arrangement configured to perform the following:
      operating an internal combustion engine based on a first injection pattern in a first operating state, and based on a second injection pattern in a second operating state;
      selecting at least one parameter of the injection patterns in a transition from the first operating state to the second operating state so that the noise emission remains constant;
      in a transition from an injection pattern having a lower noise to an injection pattern having a higher noise, first varying the at least one parameter of the first injection pattern in a step-by-step manner, and then performing a switchover to the injection pattern having the higher noise; and
      in the transition from an injection pattern having a higher noise to an injection pattern having a lower noise, first performing a switchover to the injection pattern having the lower noise, and then varying the at least one parameter of the second injection pattern in a step-by-step manner.

8. The control unit of claim 7, wherein when a switchover into certain operating states takes place, a switchover between one injection pattern to another injection pattern takes place immediately .

9. The method of claim 1, wherein the varying of the at least one parameter of the first injection pattern in the step-by-step manner occurs over a plurality of working cycles.

10. The computer readable medium of claim 5, wherein the varying of the at least one parameter of the first injection pattern in the step-by-step manner occurs over a plurality of working cycles.

11. The control unit of claim 7, wherein the varying of the at least one parameter of the first injection pattern in the step-by-step manner occurs over a plurality of working cycles.

12. The method of claim 1, wherein the at least one parameter of the injection patterns includes at least one of control starts of injections and injection periods.

13. The computer readable medium of claim 5, wherein the at least one parameter of the injection patterns includes at least one of control starts of injections and injection periods.

14. The control unit of claim 7, wherein the at least one parameter of the injection patterns includes at least one of control starts of injections and injection periods.

* * * * *